(12) United States Patent
Singhal et al.

(10) Patent No.: US 11,194,839 B2
(45) Date of Patent: Dec. 7, 2021

(54) SYSTEM AND METHOD FOR AGGREGATING SUBSCRIBER PERSPECTIVE DATA

(71) Applicant: NetScout Systems, Inc, Westford, MA (US)

(72) Inventors: Anil K. Singhal, Carlisle, MA (US); Gregory Mayo, Salem, NH (US); Rajeev Nadkarni, Chelmsford, MA (US); Narendra Byrapuram, Westford, MA (US); Bruce A. Kelley, Jr., Westford, MA (US)

(73) Assignee: NetScout Systems, Inc, Westford, MA (US)

( * ) Notice: Subject to any disclaimer, the term of this patent is extended or adjusted under 35 U.S.C. 154(b) by 251 days.

(21) Appl. No.: 15/637,816

(22) Filed: Jun. 29, 2017

(65) Prior Publication Data

US 2019/0005109 A1    Jan. 3, 2019

(51) Int. Cl.
*G06F 16/00* (2019.01)
*G06F 16/28* (2019.01)
(Continued)

(52) U.S. Cl.
CPC .......... *G06F 16/285* (2019.01); *G06F 9/4494* (2018.02); *G06F 16/437* (2019.01);
(Continued)

(58) Field of Classification Search
CPC .. G06F 16/285; G06F 16/437; G06F 16/4494; G06F 9/4494; H04L 41/5067;
(Continued)

(56) References Cited

U.S. PATENT DOCUMENTS 8,582,454 B2 * 11/2013 Singhal ................ H04L 41/069
370/252
2003/0037235 A1 * 2/2003 Aziz ...................... H04L 63/04
713/160

(Continued)

OTHER PUBLICATIONS

Extended European Search Report for European Patent Application No. EP18179358.9, dated Sep. 19, 2018.
(Continued)

*Primary Examiner* — Vincent F Boccio
(74) *Attorney, Agent, or Firm* — Locke Lord LLP; Scott D. Wofsy; Christopher J. Capelli

(57) ABSTRACT

A system and method to aggregate subscriber-perspective data from live data packets of network traffic. The method includes inspecting live packets of network traffic exchanged with a plurality of subscriber end devices. Network traffic exchanged with a subscriber end device can include network traffic exchanged with a different subscriber end device or with an application server. The packet inspection is performed at a location of interception of the live packets, each subscriber end device being an end device correlated with a subscriber. The method further includes selecting, at the location, content data of the inspected packets that correspond to packets exchanged with a selected subscriber end device of the plurality of subscriber end devices, aggregating, at the location, the content data selected, wherein the content data has not been previously aggregated, and outputting, at the location, results of the aggregation.

15 Claims, 10 Drawing Sheets

(51) Int. Cl.
*H04L 12/26* (2006.01)
*H04L 12/24* (2006.01)
*G06F 9/448* (2018.01)
*G06F 16/435* (2019.01)

(52) U.S. Cl.
CPC ........ *H04L 41/5067* (2013.01); *H04L 43/026* (2013.01); *H04L 43/04* (2013.01); *H04L 43/12* (2013.01); *H04L 41/509* (2013.01)

(58) Field of Classification Search
CPC ..... H04L 41/509; H04L 43/026; H04L 43/04; H04L 43/012; H04L 43/045
USPC ........................................................ 707/737
See application file for complete search history.

(56) References Cited

U.S. PATENT DOCUMENTS

| | | | |
|---|---|---|---|
| 2006/0088034 A1* | 4/2006 | Santitoro | H04L 47/18 370/395.21 |
| 2008/0126420 A1* | 5/2008 | Wright | H04N 21/845 |
| 2014/0293807 A1* | 10/2014 | Devolites | H04L 12/1482 370/252 |
| 2014/0304393 A1* | 10/2014 | Annamalaisami | H04L 67/146 709/224 |
| 2015/0156122 A1* | 6/2015 | Singh | H04L 61/1511 370/235 |
| 2015/0304199 A1* | 10/2015 | Leask | H04L 43/0876 709/224 |
| 2016/0099857 A1* | 4/2016 | Begwani | H04L 43/08 370/252 |
| 2016/0330246 A1* | 11/2016 | Narayanaswamy | H04L 63/0281 |
| 2017/0126476 A1 | 5/2017 | Curtin et al. | |

OTHER PUBLICATIONS

An Office Action from the European Patent Office for European Patent Application No. EP18179358.9, dated Jun. 2, 2020.

* cited by examiner

Mobile Subscriber Identity Table ⎯ 320a

| Subscriber ID (IMSI) | MSISDN | IME1+SV |
|---|---|---|
| 310260450304150 | 13107569073 | 356983021233010 |

406a ⎯ 408a ⎯ 404a / 408a

Subscriber Control Plane Table ⎯ 324

| Subscriber ID (IMSI) | Subscriber IP ID | Application ID | Message ID |
|---|---|---|---|
| 310260450304150 | 216.155.166.45 | (GTP_V1C) | 0x0001002 |
| 310260450304150 | 216.155.167.45 | (GTP_V1C) | 0x000100A |

406a ⎯ 406b ⎯ 422a ⎯ 424a

Subscriber User Plane Table ⎯ 322

| Subscriber ID (IMSI) | Subscriber IP ID | Gateway/ Node ID -1 | Gateway/ Node ID -2 | Application ID |
|---|---|---|---|---|
| 310260450304150 | 25.236.158.164 | 216.155.161.236 | 216.155.166.45 | (HTTP) |

SYSTEM AND METHOD FOR AGGREGATING SUBSCRIBER PERSPECTIVE DATA

FIELD OF THE INVENTION

The present technology relates to network monitoring and, more particularly, methods and systems to aggregate subscriber perspective data.

BACKGROUND OF THE INVENTION

Network analysis can be performed on data indicative of network performance or usage from a subscriber perspective, such as for measuring or estimating quality of experience or quality of service, determining throughput for different web services per subscriber, determining efficiency per subscriber, obtaining data useful for business analytics per subscriber, and performing marketing analyses using subscriber profiling. In order to obtain data per subscriber, subscriber session records (XDRs) are collected, stored, and aggregated at a location remote from a location at which data included or incorporated into the XDRs was observed. Large quantities of data are transferred in a raw state to the remote location and stored, after which aggregation and analytics are performed on this large quantity of data. The transfer, storage, and processing of such large quantities of data consumes large amounts of bandwidth, storage, and computing resources. Additionally, it is predicted that there will be major increases in network traffic as the number of subscribers, devices, and applications available trend to increase. The increase in network traffic will exacerbate the challenge of providing these large amounts of bandwidth, storage and computing resources.

Such conventional methods and systems have generally been considered satisfactory for their intended purpose. However, there is still a need in the art for estimation of an amount of acknowledgement application data when an encrypted transport protocol is used.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to aggregate subscriber-perspective data from live data packets of network traffic. The method includes inspecting live packets of network traffic exchanged with a plurality of subscriber end devices. Network traffic exchanged with a subscriber end device can include network traffic exchanged with a different subscriber end device or with an application server. The packet inspection is performed at a location of interception of the live packets, each subscriber end device being an end device correlated with a subscriber. The method further includes selecting, at the location, content data of the inspected packets that correspond to packets exchanged with a selected subscriber end device of the plurality of subscriber end devices, aggregating, at the location, the content data selected, and outputting, at the location, results of the aggregation.

In accordance with another aspect, an interception device for intercepting live packets of network traffic is disclosed. The interception device includes an intercept component disposed at a location to intercept, at the location, live packets of network traffic exchanged with a plurality of subscriber end devices, each subscriber end device being an end device correlated with a subscriber. The interception device further includes a memory configured to store instructions and a processor disposed at the location and in communication with the memory. The processor upon execution of the instructions is configured to inspect the intercepted live packets, select content data of the inspected packets that correspond to packets exchanged with a selected subscriber end device of the plurality of subscriber end devices, aggregate the content data selected, wherein the content data has not been previously aggregated, and output results of the aggregation.

In accordance with still another aspect, a non-transitory computer readable storage medium and one or more computer programs embedded therein is disclosed. The computer programs includes instructions, which when executed by a computer system, cause the computer system to inspect live packets of network traffic exchanged with a plurality of subscriber end devices, the packet inspection being performed at a location of interception of the live packets, each subscriber end device being an end device correlated with a subscriber, select content data of the inspected packets that correspond to packets exchanged with a selected subscriber end device of the plurality of subscriber end devices, aggregate, at the location, the content data selected, wherein the content data has not been previously aggregated, and output results of the aggregation.

BRIEF DESCRIPTION OF THE DRAWINGS

The accompanying appendices and/or drawings illustrate various non-limiting, example, inventive aspects in accordance with the present disclosure:

FIGS. 4A and 4B illustrate a diagram of portions of data structures stored in the buffer shown in FIG. 3;

DETAILED DESCRIPTION OF CERTAIN EMBODIMENTS

Figure 1:
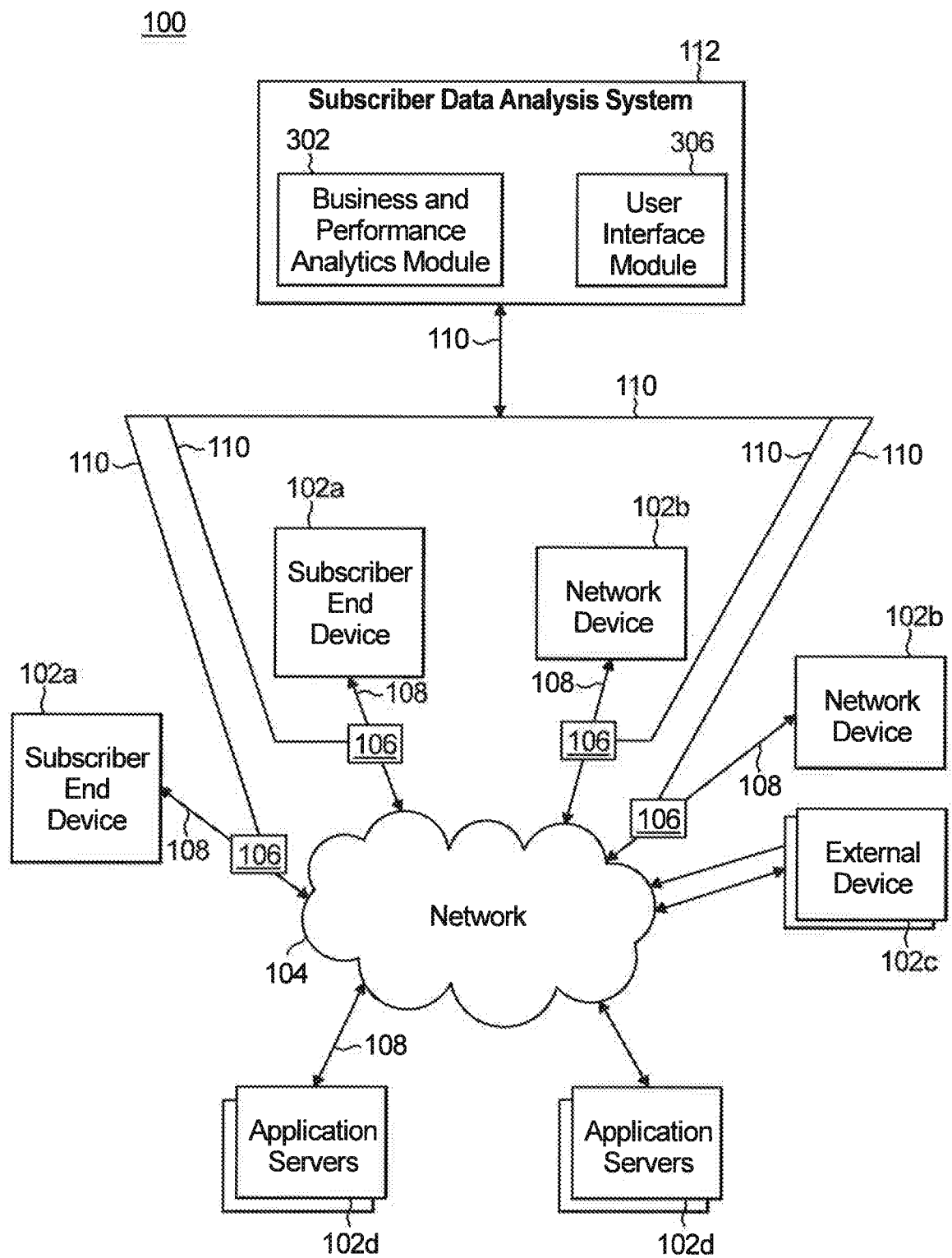
FIG. 1 illustrates a block diagram of an example network monitoring system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network analytics system in accordance with the disclosure is shown in FIG. 1 and is designated generally by reference character 100. Other embodiments of the network monitoring system 100 in accordance with the disclosure, or aspects thereof, are provided in FIGS. 2-9, as will be described. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network monitoring system 100 includes a plurality of devices, referred to collectively as devices 102, which are coupled to a network 104 via data links 108. These data links 108 can be wireless links, wired links, or a combination thereof. The devices 102 include, for example, subscriber end devices 102a, network nodes 102b, application servers 102d, and external devices 102c. A plurality of intercept devices 106 intercept live packets transmitted between devices 102. A subscriber data analysis system 112 is coupled to the intercept devices 106 to process data output by the intercept devices 106 that is associated with a specific service.

The devices 102 can communicate with other devices 102 that are coupled to the same network or a different network via the network 104. The network 104 can be, for example, a network such as the Internet, a private network, a different public network, a cellular network, a personal communication service (PCS) network, a public switched telephone network (PSTN), a wired network, a wireless network, etc. Network traffic can be transmitted between devices of the network 104 and/or between devices of the network 104 and devices of an external network (not shown) via network 104.

The devices 102 can include, for example, mobile computing devices, smart phones, servers, media servers, application servers, stationary computing devices, printers or multi-functions devices, sensors, consumer devices, and network devices, such as routers, switches, hubs, and bridges that are used to communicatively couple devices 102 to one another.

Subscriber end devices 102a are end devices that provide an interface to the network 104 for subscribers of a specific service, such as an internet service, a wireless communication service, or a web-based service, without limitation to particular type of service. An end device is a source or destination of a communication sent via network 104 that interfaces between a user and network 104. When the user is a subscriber of the specific service, the end device used by the user to send or receive communications via network 104 is referred to as a subscriber end device 102a. Examples of subscriber end devices 102a include mobile computing devices, smart phones, web servers, web-connected machines or consumer devices, web-connected sensors, banking servers, securities trading servers, point-of-sale (POS) terminals, machines on manufacturing assembly lines, etc.

Network nodes 102b are devices that facilitate the network 104 by handling network data, such as for routing traffic through the network 104 and/or performing security or monitoring operations associated with the network traffic. External devices 102c can include network nodes or end devices associated with another network that can communicate with devices 102a and 102b via network 104. The external devices 102c can be network devices, application servers, or user end devices, wherein the end devices may not be monitored by intercept devices 106.

Application servers 102d can include servers that provide a service to subscriber end devices 102a, which can be associated with individuals or other servers. While the communications to and from the application servers 102d can be monitored, the disclosure is directed to processing information obtained from monitoring the subscriber end devices 102a rather than information obtained from monitoring the application servers 102d. Examples of application servers 102d include media servers for providing a media service (e.g., streaming video or audio); voice over internet servers for providing voice over internet services; data analysis servers for collecting and analyzing data from e.g., sensors; configuration servers for (re-)configuring an end device; transaction servers for processing a transaction. Examples of such transactions include, for example and without limitation, retail purchases, banking transactions, and securities transactions.

One or more packet intercept devices 106 are provided that can be distributed about the network 104 to intercept packets flowing at various locations of the network 104. The intercept devices 106 are disposed at locations along the data links 108 and/or disposed at or integrated with devices 102 for accessing a live packet stream transmitted between end devices, wherein at least one of the end devices is a subscriber end device 102a associated with the subscriber data analysis system 112. The intercept devices 106 and the subscriber data analysis system 112 are both associated with the specific service to monitor network communications associated with that service. In particular, the intercept devices 106 and the subscriber data analysis system 112 monitor the communications transmitted via network 104 from a subscriber perspective of one or more selected subscribers.

Interception of a packet by an intercept device 106 refers to accessing the packet, such as to enable inspecting contents of the entire packet or portions of the packet. The intercept device 106 can make a copy of the packet or portions thereof, or store the packet or portions thereof. The interception performed by the intercept device 106 is performed at the physical or virtual location of the intercept device 106.

The intercept device 106 inspects the live packets. This inspection can be performed at the location at which the live packets were intercepted. The inspection of one of the live packets includes deep packet inspection, including inspection of contents of at least one of a header and footer of the packet. Inspection includes accessing and reading the contents so that the contents can be processed.

The intercept device 106 can determine whether contents of the packet inspected are encrypted. When the contents of the packet are encrypted, the intercept device 106 can decrypt encrypted portions of the contents. This decryption can be performed at the location at which the live packets were intercepted.

The intercept device 106 can select content that corresponds to packets exchanges with one or more selected subscriber end devices. This selection can be performed at the location at which the live packets were intercepted.

The intercept device 106 can further process the content of the live packets, such as to make comparisons, perform calculations, make decisions, etc. This processing can be performed at the location at which the live packets were intercepted.

The intercept device 106 can further aggregate content data of the live packets. For example, content data associated with one or more selected subscriber end devices can be aggregated. This aggregation can be performed at the location at which the live packets were intercepted.

In embodiments, the interception of the live packets performed at the location of the intercept devices 106 is the first interception of the live packets by any device, meaning the live packets that were intercepted by the intercept device 106 have not been previously intercepted, such as for copying or storage of the packets.

The term "live packet," as used herein, means that the packet is included in an actual stream of end-to-end network traffic and is en route between end devices.

In embodiments, the intercept devices 106 process content of the packets for the first time. In other words, at the point in time that the content of a packet is processed by an intercept device 106, the content of the packet has not been previously processed, e.g., by any other devices other than for routing the packets to their destination.

In embodiments, the intercept devices 106 aggregate content of the packets for the first time. In other words, at the point in time that the content of an intercepted packet has been aggregated with content of other intercepted packets by a intercept device 106, the content of this intercepted packet has not been previously aggregated with content of other intercepted packets, e.g., by any other devices.

In embodiments, the intercept devices 106 process content of the packets for the first time to select packets associated with one or more selected subscriber end devices, meaning content of the packets has not been previously processed to select packets associated with one or more selected subscriber end devices by any other devices. In other words, at the point in time that the intercept devices 106 selects packets associated with one or more selected subscriber end devices, the packets have not been previously processed to select packets associated with one or more selected subscriber devices, e.g., by any other devices.

The intercept devices 106 can be passive or active and include software, firmware, and/or hardware components, such as taps, probes, or port mirrors that can be positioned inline along data links 108 between any devices 102 or integrated with devices 102. In embodiments, the intercept devices 106 can include software modules, which can include software agents. In embodiments, the intercept devices 106 can be physical or virtual devices that are physically remote relative to devices 102 and the data links 108. Whether implemented as a physical or virtual device, the intercept devices 106 use firmware or a hardware processing device that executes software instructions, which enables performance of the disclosed functions.

The intercept devices 106 can be located remotely from one another and can further be located remotely from the subscriber data analysis system 112. Data output by the intercept devices 106 about the intercepted packets is transmitted to the subscriber data analysis system 112 via one or more data paths 110. Data paths 110 can include a bus and/or communication links, where the communication links of data paths 110 can be wireless, wired, or a combination thereof. In embodiments, data paths 110 can be included in a network.

The subscriber data analysis system 112 processes data output by the intercept devices 106. Thus, the subscriber data analysis system 112 can receive aggregated subscriber-perspective data from one or more intercept devices 106 and perform analytic processing to this data, such as to perform business analysis and/or marketing analysis processing. Business analysis can be performed from the subscriber perspective, such as to analyze subscriber quality of service (QoS), quality of experience (QoE), and/or network performance with regards to one or more selected subscribers. Marketing analysis can analyze subscriber behavior and characteristics, such as to profile subscribers and provide analytical data of value to the business.

Each of intercept devices 106 and subscriber data analysis system 112 may be a special purpose computing device or a software component (not limited to a single process) dedicated to its corresponding functions related to monitoring data communicated via the network 104. Alternatively, each of intercept devices 106 and subscriber data analysis system 112 may be a general purpose computing device with specialized software components installed thereon. In one embodiment, the intercept devices 106 are embodied as nGenius Probes, nGenius InfiniStream, or All InfiniStream Next generation probes collectively called as ISNG probes available from NetScout Systems, Inc. of Westford, Mass. In embodiments the subscriber data analysis system 112 is a computing device running Netscout nGenius Business Analytics (nBA) application software, available from NetScout Systems, Inc. of Westford, Mass.

Figure 2:
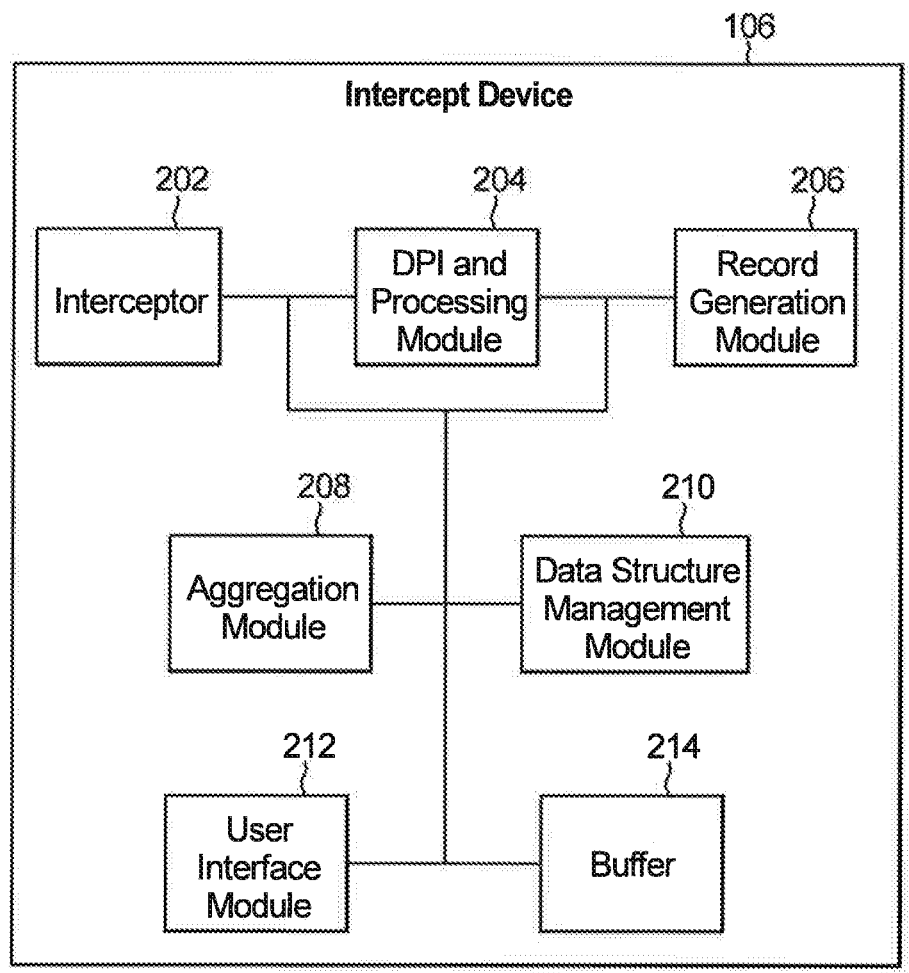
FIG. 2 illustrates a block diagram of an example intercept device, in accordance with an illustrative embodiment of the present disclosure.

With reference to FIG. 2, a block diagram of one of the intercept devices 106 is shown. The intercept device 106 includes an interceptor 202, a DPI and processing module 204, a record generation module 206, an aggregation module 208, a data structure management module 210, a user interface (UI) module 212, and a buffer 214.

The interceptor 202 intercepts live packets of the network traffic and provides the DPI and processing module 204 with an opportunity to read and access the live intercepted packets or provides the DPI and processing module 204 with a copy of the intercepted live packets. The DPI and processing module 204 analyzes the payload contents and gathers subscriber specific information pertaining to a transaction interacted between a subscriber and an end node. The end node may also be another subscriber or an application server—examples of which would be a banking or retail server or a voice signaling server. The DPI and processing module 204 inspects and processes the packets that it accesses or for which it receives copies.

When inspecting a packet, the DPI and processing module 204 determines if any portion of the packet needs to be decrypted and uses a key to decrypt the packet. The DPI and processing module 204 can access the key from the buffer 214 in which key information can be stored. The DPI and processing module 204 can access contents of the header and/or payload data of the packet or packet copy, and process the contents, such as to read data, make comparisons using the data, make decisions based on the data, perform calculations using the data, sort data, select data, or extract data, etc. The DPI and processing module 204 can select content data of packets exchanged with one or more selected subscriber end devices.

The record generation module 206 can identify packets associated with individual sessions and generate a session record that includes a summarization of contents included in the identified packets. A session includes packets exchanged between two subscriber end devices that are associated with a particular conversation or subscriber interaction. The record generation module 206 can thus generate session records for conversations associated with one or more selected subscriber end devices or between a subscriber end device and an application server. A session can include multiple packets. A session can be associated with a particular type of a transaction, such as a web retail or banking interaction, a voice conversation between two subscribers, or a subscriber watching a video provided by an on-demand service. Each video can include multiple packets rendering the video images.

The aggregation module 208 aggregates content data that has been selected, such as content data that has been selected as being exchanged with one or more selected subscriber end devices. For example, the aggregation module 208 can aggregate for one or more selected subscriber end devices session records that correspond to one or more conversations conducted with the one or more selected subscriber end devices.

In embodiments, the aggregation module 208 may choose to aggregate user plane data, control plane data, and/or voice or media transmission data from inspected data packets that were determined to be exchanged with one or more subscriber end devices. In embodiments, the aggregation of the user plane data, control plane data, or voice or media transmission data can include aggregating data included in session records for a session that includes the one or more selected subscriber end devices.

The data structure management module 210 can store the aggregated user plane data in a subscriber user plane data structure (e.g., table, without limitation), the aggregated user control data in a subscriber user control data structure (e.g., table, without limitation), and the aggregated user voice or media transmission data in a subscriber user voice or media transmission data structure (e.g., table, without limitation). Additionally, the data structure management module 210 can manage the user plane, user control, and voice or media transmission tables as well as one or more identity tables. The identity tables include entries for various discovered identities of subscriber end devices and network nodes, such as identities or IP addresses of a mobile subscriber end device and network nodes.

The UI module 212 can interface with user input devices, such as a keyboard, pointing device (e.g., mouse, without limitation), touch screen, etc. The UI module 210 can receive data via the user input devices, wherein the received data can be input to the software modules, such as the DPI and processing module 204, the record generation module 206, the aggregation module, and/or the data structure management module. The UI module 210 can further interface with user output devices, such as a display monitor, audio speakers, and/or a printer to output data generated by the aggregation module 208.

The buffer 214 stores encryption key information and data structures that store data output by the aggregation module 208. The data structures can be tables, arrays, lists, graphs, trees, etc. The buffer 214 can also store program data output or used by the modules of the intercept device 106.

The intercept device 106 can further interface with other processing devices to exchange data, e.g., by receiving or transmitting data, to other processing devices or software modules, such as the subscriber data analysis system 112.

The subscriber data analysis system 112 can access the aggregated output, such as by accessing information stored in the data structures provided in the buffer 214, to perform analysis. Analytics performed by the subscriber data analysis system 112 can include, for example, business analytics and marketing analytics. The marketing analytics can use information known about subscribers using subscriber end devices to profile usage and users, such as when using particular applications.

The data accessed by the subscriber data analysis system 112 has already been formed into session records that have further been aggregated into consolidated data. Since the intercept devices 106 consolidate the data at the location where the packet data is intercepted, only selected data of the consolidated data is transmitted between the intercept devices 106 and the subscriber data analysis system 112, without the need to transmit raw data packets or session records, thus reducing bandwidth usage. Additionally, the intercept devices 106 do not need to store the raw data packets or the session records. Furthermore, the intercept devices 106 process incoming data against consolidated data by adding or updating entries in the data structures stored in buffer 214. Since there is not a need to store the raw data packets or session records, or compute this data once it has been aggregated, storage and computing consumption is reduced.

Figure 3:
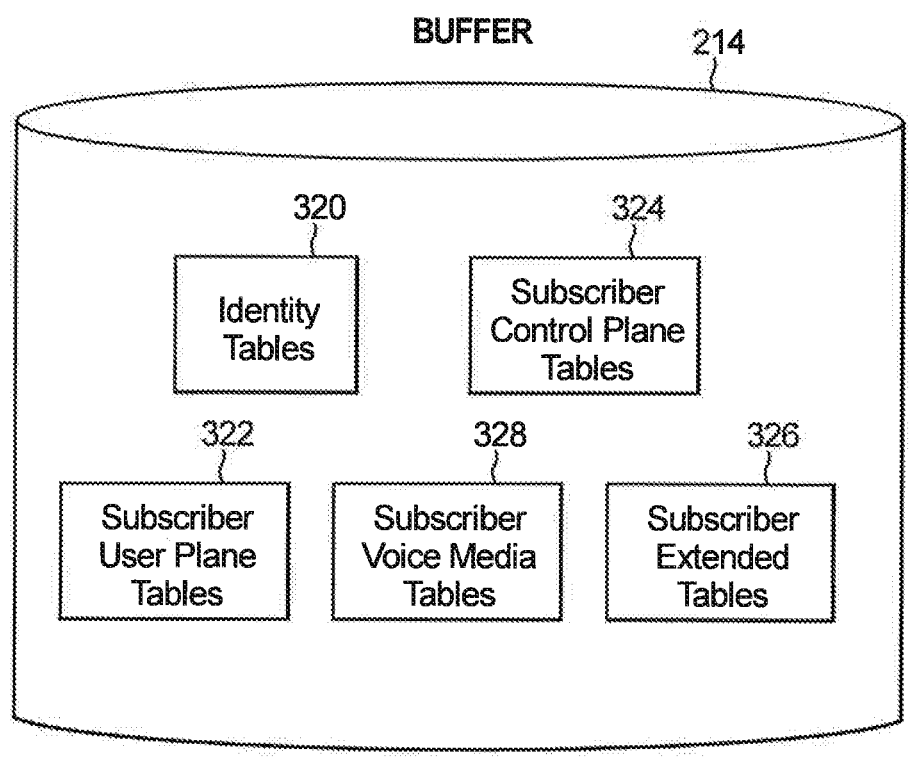
FIG. 3 illustrates a block diagram of an example buffer of the intercept device shown in FIG. 2.

FIG. 3 shows a block diagram of aggregated output stored by the buffer 214. The buffer 214 includes identity tables 320, a subscriber user plane table 322, a subscriber control plane table 324, a subscriber voice/media table 326, and a subscriber extended table 328. The identity tables 320 can store entries for discovered identifying information of subscriber end devices and network nodes. The identifying information can be an identification number associated with the device (subscriber end device or network node) being identified or usage information (such as location and timing) that can be used to identify the device.

Figure 4A:
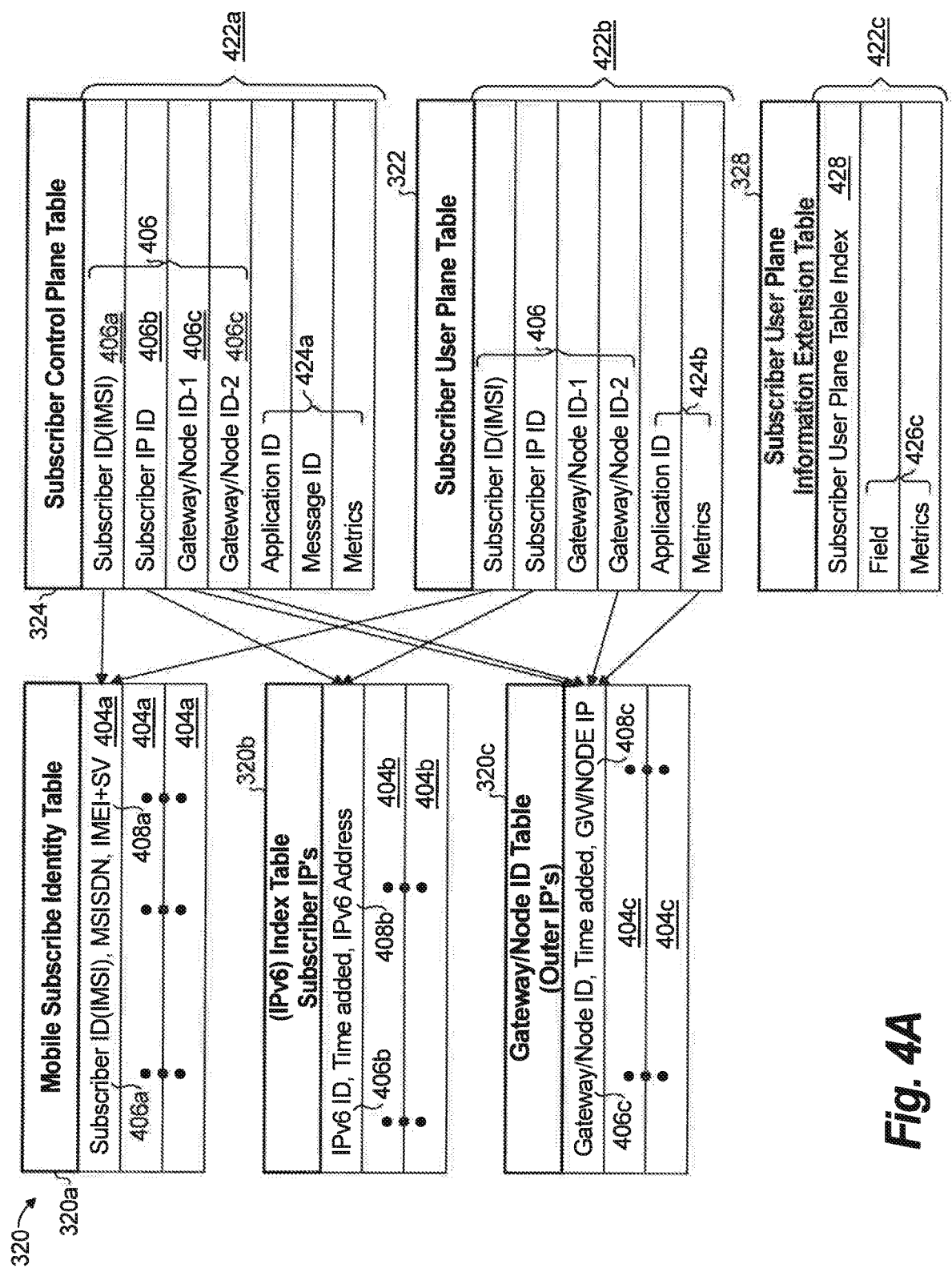

Examples of identity tables 320, as shown in FIG. 4A, include a mobile subscriber identity table, a subscriber IP table, and a network node ID table, however the disclosure is not limited to the examples shown. Entries can be added to each of the identity tables at regular small time intervals, such as at five minute increments. Entries are only added if they have not yet been included in the corresponding identity table. The identity tables can be flushed at regular large time intervals, such as on a daily basis.

The subscriber user plane table 322 can store subscriber throughput and transaction responsiveness metrics that aggregate session records based on a selected application. Each entry references a unique key, which is one of the identifications stored in the identity tables 320.

The subscriber control plane table 324 can store key performance indicator (KPI) metrics for the control plane or a signaling application, such as SIP or DNS that may selectively aggregate session data. KPI transactions can be recorded in separate rows with timestamps for each transaction to mark a time at which the transaction originated. Each entry references a unique key, which is one of the identifications stored in the identity tables 320. Each entry can include multiple rows.

The subscriber voice/media table 326 can store key performance indicator (KPI) metrics specific to voice or media transmissions that aggregate session data. Each entry references a unique key, which is one of the identifications stored in the identity tables 320. KPI transactions can be recorded in separate rows with timestamps for each transaction to mark a time at which the transaction originated. Each entry references a key, which is one of the identifications stored in the identity tables 320. Each entry can include multiple rows.

The subscriber extended table 328 is used on demand per subscriber session in response to requests by a user or a processing device. Information that can be included in the subscriber extended table 328, when requested, includes, for example, HTTP URI, host, and/or referrer information, wherein the disclosure is not limited to these particular examples. A row of the subscriber extended table 328 can thus be added or removed on demand, each row pertaining to a specific subscriber end device transaction.

Each of the subscriber user plane table 322, the subscriber control plane table 324, the subscriber voice/media table 326, and the subscriber extended tables 328 can be flushed at regular intervals, similar to the identity tables 320.

FIGS. 4A and 4B show examples of some of the tables stored in the buffer 214. Example identity tables 320 include a mobile subscriber identity table 320a, a subscriber IP index table 320b, and a gateway/node ID table 320c. Each table 320 can store multiple entries 404.

Entries 404a in table 320a use a subscriber end device international mobile subscriber identity (IMSI) as a subscriber ID, which is used as a key for the respective entries 404a. Each entry 404a, can further store, in association with its key, additional ID information 408a, such as mobile station international subscriber directory number (MSISDN) and international mobile station equipment identity+software version (IMEI+SV).

Entries 404b in table 320b use IPv6 ID as the subscriber IP, which is used as a key for the respective entries 404b. Each entry 404b can further store, in association with its key, additional ID information 408b, including the time when the entry was added (also referred to as time added information). The time added information reflects the subscriber's IP correctly in reference to time. The subscriber's IP can change over time, for example when the subscriber's device is assigned IP-A as its IP the first time the subscriber enters the network via its subscriber end device. If the subscriber shuts down the subscriber end device and then reboots the device, a new IP-B would be assigned that is different than IP-A.

Entries 404c in table 320b use Gateway (GW)/Node ID as the gateway/node ID, which is used as a key to identify the gateway nodes through which the current transactions are brokered. Each entry 404c can further store, in association with its key, additional ID information 408c with the time added information along with the GW/NODE IP.

Regarding the subscriber control plane table 324, an entry 422a is shown that includes identification information 406, including subscriber ID (IMSI) 406a, subscriber IP ID 406b and gateway/node IDs 406c. The identification information 406 is used as an index to the relevant identity tables 320. The entry 422a also includes aggregated data 424a, including, in the example shown, application ID, message ID, and metrics, which are associated with the KPI used in the analytics for the subscribers transaction.

Regarding the subscriber user plane table 322, an entry 422b is shown that includes identification information 406 similar to that shown for other subscriber control plane table 324. The entry 422b also includes aggregated data 424b, including, in the example shown, application ID and metrics, which can include application throughput and responsiveness metrics.

Regarding the subscriber user plane information extension table 328, an entry 422c is shown that includes an index 424 to the subscriber user plane table 322 and aggregated metrics 426c, such as a field (that was selected by a request) and associated metrics. The index 424 points to an entry in the subscriber user plane table 322 for which additional metrics were solicited by the request.

With reference to FIG. 4B, shown are entry 404a of the mobile subscriber identity table 320a, entries 422a of the subscriber control plane table 324, and entry 422b of the subscriber user plane table 322. Each of the entries 404a, 422a, and 422b use subscriber ID (IMSI) 406a as a key. Entry 404a further includes additional ID information 408a. Entries 422a further include identification information 406b and aggregated data 424a. Entry 422b further includes identification information 406b and 406c as well as aggregated data 424c.

Figure 9:
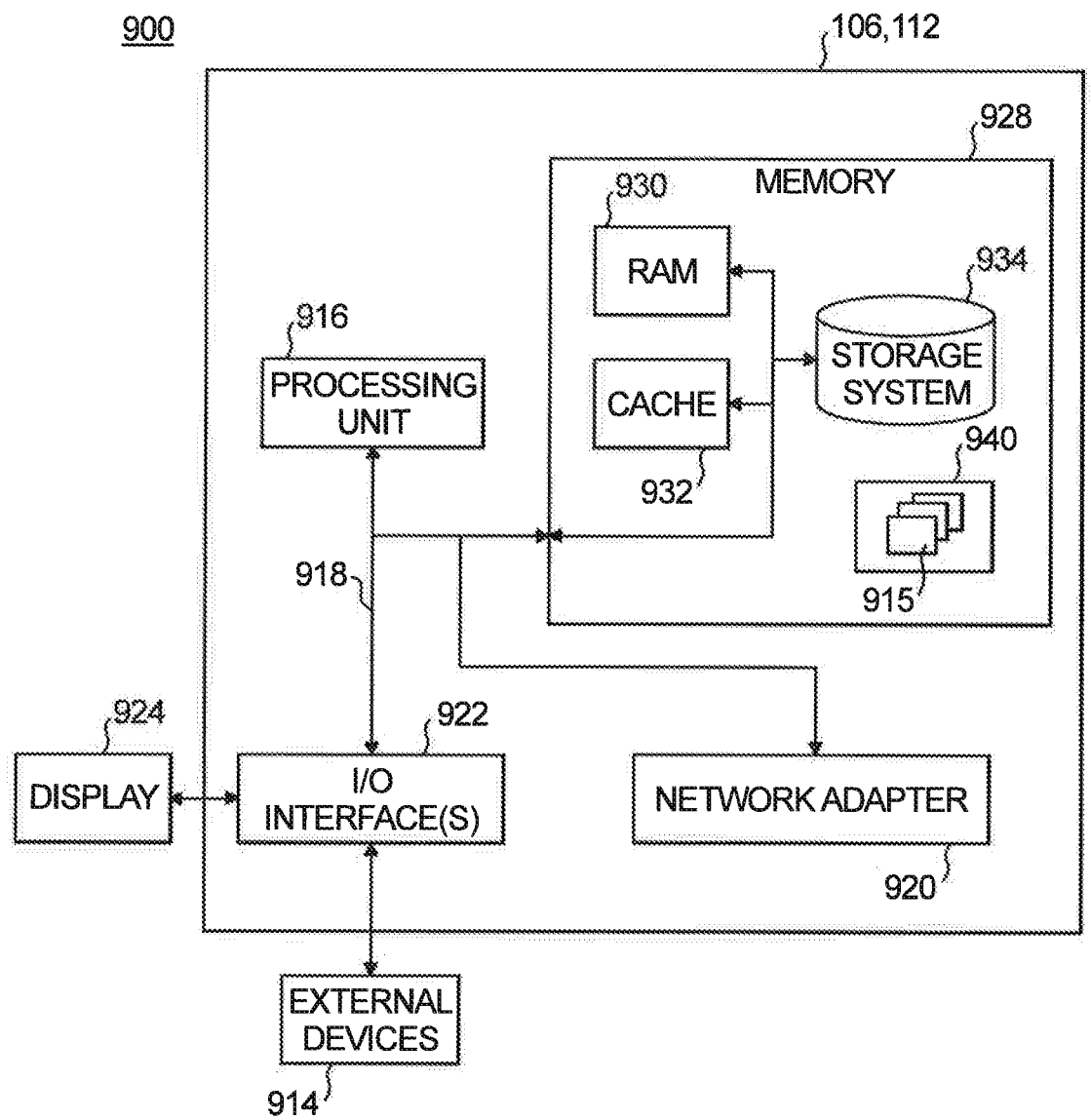
FIG. 9 illustrates a schematic block diagram of an example network computing device that implements an intercept device shown in FIG. 2 and a subscriber data analysis system shown in FIG. 1, in accordance with an illustrative embodiment of the present disclosure.

The intercept device 106 can further interface with other processing devices to exchange data e.g., by receiving or transmitting data, to other processing devices or software modules, such as via an I/O interface or a network adapter, as shown in FIG. 9 as components 922 and 920.

With reference now to FIGS. 5-8, shown are flowcharts demonstrating implementation of the various exemplary embodiments. It is noted that the order of operations shown in FIGS. 5-8 is not required, so in principle, the various operations may be performed out of the illustrated order or in parallel. Also certain operations may be skipped, different operations may be added or substituted, or selected operations or groups of operations may be performed in a separate application following the embodiments described herein.

Figure 5:
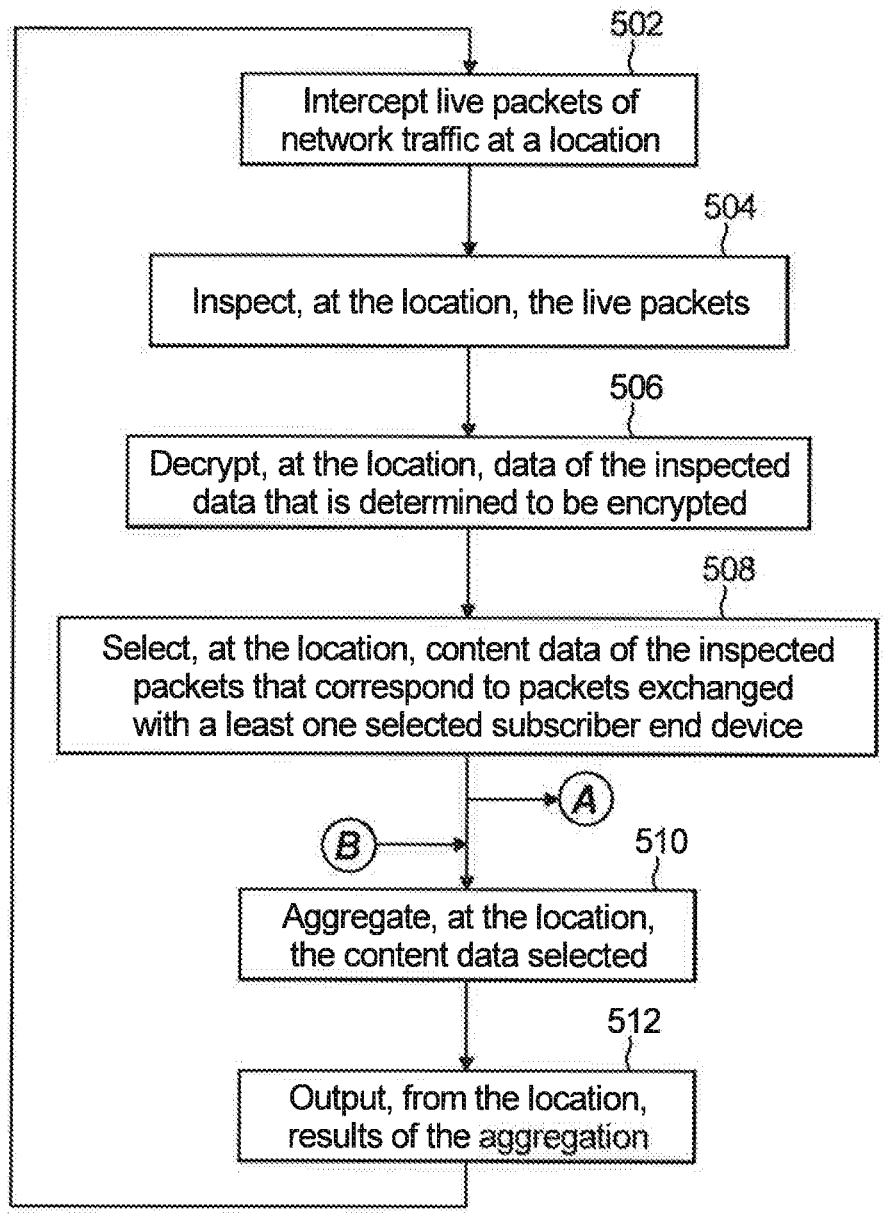
FIG. 5 illustrates a flowchart of an example method for aggregating subscriber-based data from intercepted live packets in accordance with an illustrative embodiment of the present disclosure.

With reference to FIG. 5, embodiments of a method are shown for monitoring a network. The method is performed by an intercept device, such as the intercept device 106 shown in FIG. 1. In embodiments, all of the operations shown are performed by the intercept device 106 at the location where the intercept device intercepts network traffic.

At operation 502, live packets of network traffic are intercepted at a location. At operation 504, the live packets are inspected. At operation 506, data of the inspected data that is determined to be encrypted is decrypted. At operation 508, content data of the inspected packets is selected that correspond to packets exchanged with at least one selected subscriber end device. Next, at operation 510, the content data selected is aggregated. In embodiments, the content data has not been previously aggregated. At operation 512, results of the aggregation are output. The operations of FIG. 5 can be performed repeatedly or iteratively as additional live packets of the network traffic are intercepted and/or for different requested subscriber end devices.

The operations described above are performed against the data collected for each subscriber end device, based on, for example, an instruction by the DPI and processing module 204 to select each subscriber end device having an identification (e.g., ID, such as an IMSI or internet protocol (IP) address) that has been recently discovered (such as described below with reference to operation 702 of FIG. 7) or based on any preset rules defined by a user or analytics application.

Figure 6:
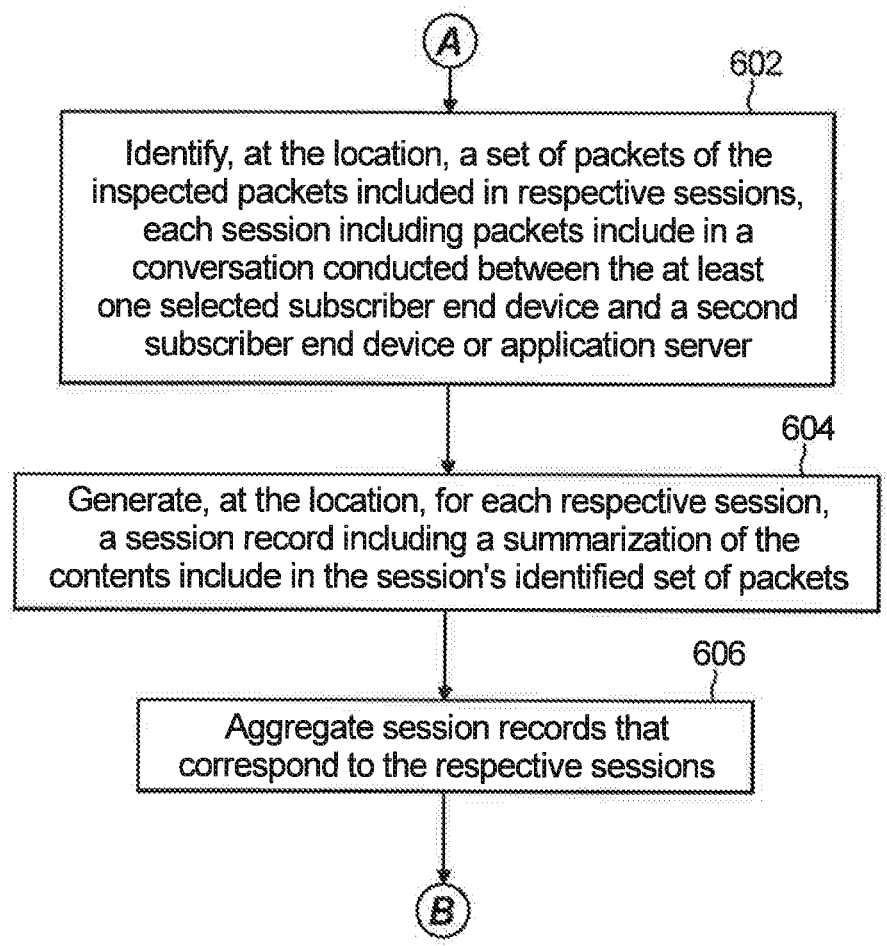
FIG. 6 illustrates a portion of the flowchart shown in FIG. 5 that provides an example method for generating session records from the intercepted live packets in accordance with an illustrative embodiment of the present disclosure.

With reference to FIG. 6, in accordance with embodiments, the method further includes performing operations 602, 604, and 606 after operation 508 of FIG. 5. In accordance with embodiments, operations 602, 604, and 606 are performed by the intercept device at the location where the intercept device intercepts network traffic.

At operation 602, a set of packets of the inspected packets are identified that are included in respective sessions. Each session includes packets that are included in a conversation conducted between the at least one selected subscriber end device and a second subscriber end device or an application server. At operation 604, a session record for each respective session is generated that includes a summarization of contents included in the session's identified set of packets. At operation 606, session records that correspond to the respective sessions are aggregated. After operation 606 is performed, the method can continue at operation 510 of FIG. 5. The order of operation 510 relative to operations 602, 604, and 606 is not limited to a particular order.

Figure 7:
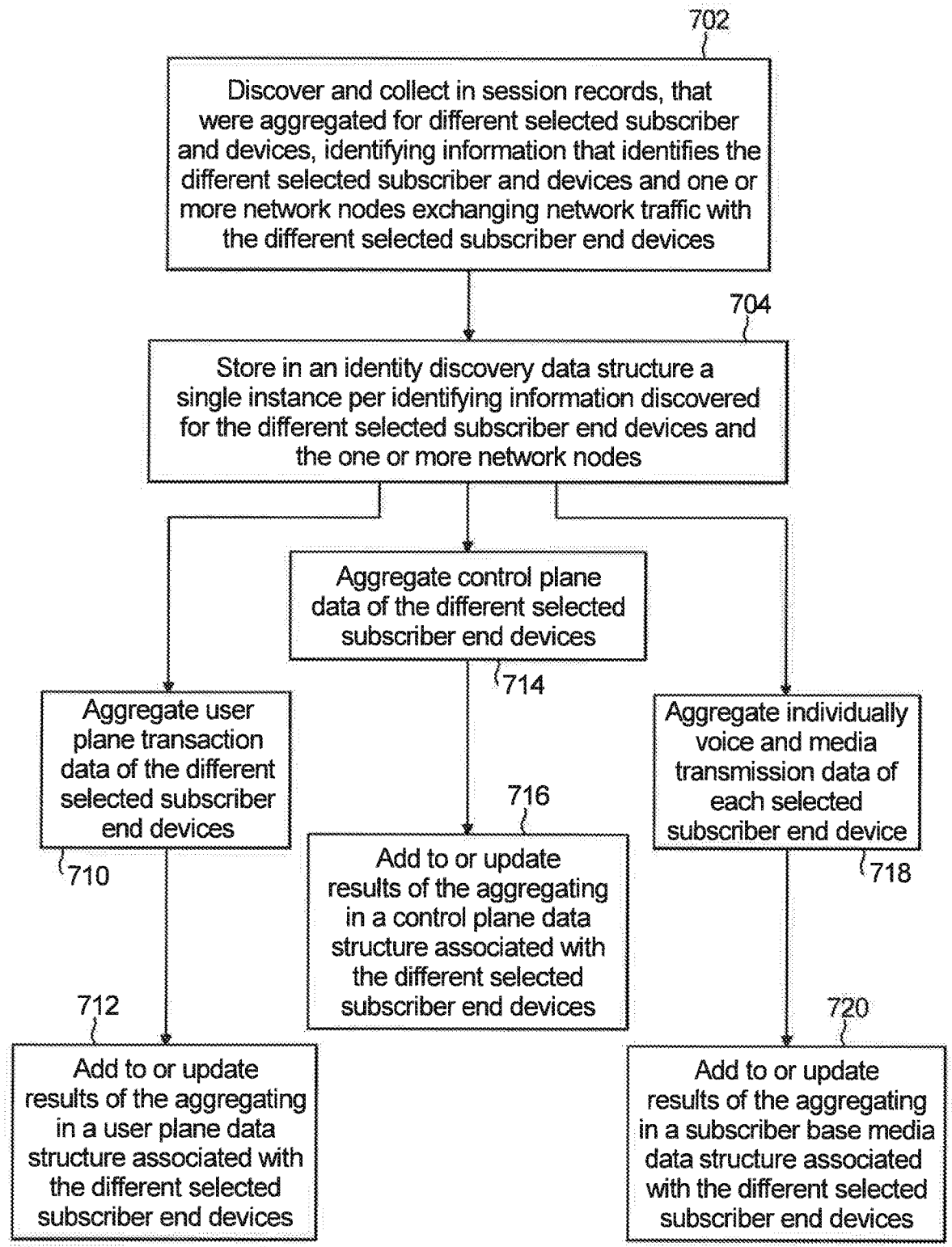
FIG. 7 illustrates a flowchart of an example method for storing data that was aggregated from intercepted live packets in data structures in accordance with an illustrative embodiment of the present disclosure.

With reference to FIG. 7, in embodiments, operation 512 of FIG. 5 further includes performing one or more of operations 702, 710, 712, 714, 716, 718, and 720. Any of pairs of operations (710, 712), (714, 716), and (718, 720) can be performed. If multiple pairs of these operations are performed, the pairs can be performed in parallel or sequentially.

At operation 702, identifying information is discovered and collected in session records that were aggregated for different selected subscriber end devices. The identifying information identifies the different selected subscriber end devices and one or more network nodes exchanging network traffic with the different selected subscriber end devices. At operation 704, a single instance per identifying information discovered for the different selected subscriber end devices and the one or more network nodes is stored in an identity discovery data structure. At operation 710, user plane transaction data of the different selected subscriber end devices is aggregated. Operation 710 can be included with operation 510 of FIG. 5, such as in order to aggregate data from multiple repetitions of FIG. 5 for the different selected subscriber end devices. At operation 712, results of the aggregating are used to add to or update data stored in a user plane data structure associated with the different selected subscriber end devices, such as subscriber user plane data structure 322 shown in FIG. 3. Operation 712 can be included with operation 512 of FIG. 5.

At operation 714, control plane data of the different selected subscriber end device is aggregated. Operation 714 can be included with operation 510 of FIG. 5, such as in order to aggregate data from multiple iterations of FIG. 5 for the different selected subscriber end devices. At operation 716, results of the aggregating are used to add to or update data stored in a control plane data structure associated with the different selected subscriber end devices. Operation 716 can be included with operation 512 of FIG. 5.

At operation 718, voice and media transmission data of each selected subscriber end devices is aggregated individually. Operation 718 can be included with operation 510 of FIG. 5, such as in order to aggregate data from multiple iterations of FIG. 5 for the different selected subscriber devices. At operation 720, results of the aggregation are used to add to or update data stored in a subscriber base media data structure associated with the different selected subscriber end devices, such as subscriber base media data structure 326 shown in FIG. 3. Operation 720 can be included with operation 512 of FIG. 5.

Figure 8:
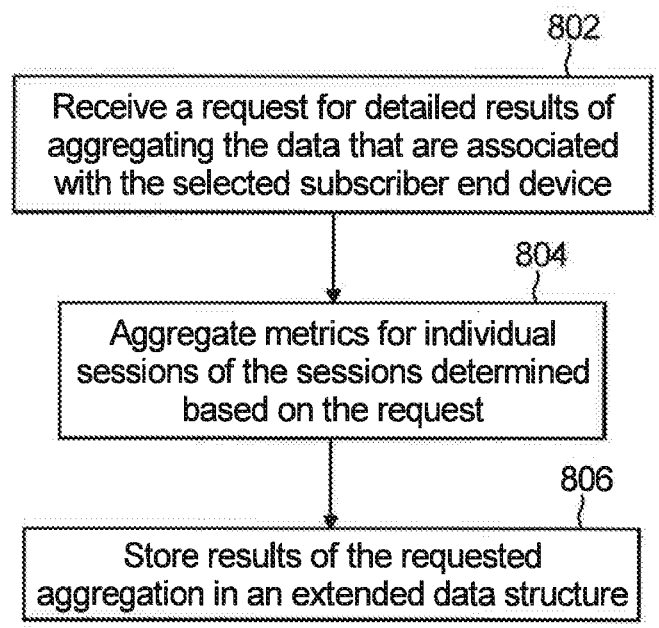
FIG. 8 illustrates a flowchart of an example method for aggregating requested data from intercepted live packets and storing the results in a data structure in accordance with an illustrative embodiment of the present disclosure.

With reference to FIG. 8, in embodiments, operation 512 of FIG. 5 further includes performing operations 804 and 806, which are performed in response to operation 802. Operation 802 can be performed at any time during performance of the method shown in any of FIGS. 5-7. At operation 802, a request may be received for detailed results of aggregating the data that are associated with selected subscriber end device. At operation 804, metrics for one or more individual sessions associated with the selected subscriber end device are aggregated based on the request. At operation 806, results of the requested aggregation are stored in an extended data structure, such as subscriber extended table 328 shown in FIG. 3. Operation 802 may also be done at the start using pre-set rules and extended data collected for one or more subscribers to be used by analytics application.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the intercept devices 106 and the subscriber data analysis system 112 may be implemented or executed by one or more computer systems. For example, packet analysis system can be implemented using a computer system such as example computer system 900 illustrated in FIG. 9. In various embodiments, computer system 902 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 902 is only one example of a suitable system and is not intended to suggest any limitation as to the scope of use or functionality of embodiments of the disclosure described herein. Regardless, computer system 902 is capable of being implemented and/or performing any of the functionality set forth hereinabove.

Computer system 902 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 902 may be practiced in distributed data processing environments where tasks are performed by remote processing devices that are linked through a communications network. In a distributed data processing environment, program modules may be located in both local and remote computer system storage media including memory storage devices.

Computer system 902 is shown in FIG. 9 in the form of a general-purpose computing device. The components of computer system 902 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus or a virtual messaging link like MQ (Message Queuing)

Computer system 902 typically includes a variety of computer system readable media. Such media may be any available media that is accessible by the intercept device 106 or the subscriber data analysis system 112, and it includes both volatile and non-volatile media, removable and non-removable media.

System memory 928 can include computer system readable media in the form of volatile memory, such as random access memory (RAM) 930 and/or cache memory 932. Computer system 902 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure. In embodiments, buffer 214 shown in FIG. 2 may be included in memory 928.

Program/utility 940, having a set (at least one) of program modules 915, such as the DPI and processing module 204, the record generation module 206 the aggregation module, the data structure management module, and the user interface module 212, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

Computer system 902 may also communicate with one or more external devices 914 such as a keyboard, a pointing device, a display 924, etc.; one or more devices that enable a user to interact with computer system 902; and/or any devices (e.g., network card, modem, etc.) that enable the intercept device 106 or the subscriber data analysis system 112 to communicate with one or more other computing devices. Such communication can occur via Input/Output (I/O) interfaces 922. Still yet, computer system 902 can communicate with one or more networks such as a local area network (LAN), a general wide area network (WAN), and/or a public network (e.g., the Internet) via network adapter 920. For example, the intercept devices 106 and the subscriber data analysis system 112 may use network adapter 920 to communicate with each other via a network, such as a network that includes data paths 110. As depicted, network adapter 920 communicates with the other components of the intercept device 106 or the subscriber data analysis system 112 via bus 918. It should be understood that although not shown, other hardware and/or software components could be used in conjunction with computer system 902. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the intercept devices 106 includes aggregation and consolidation of data that is then available for analytics, such as by the subscriber data analysis system 112. This reduces the amount of data transmitted between the intercept devices 106 and the subscriber data analysis system 112, reducing bandwidth usage. Additionally, the intercept devices 106 do not need to store the raw data packets or the session records once the content has been aggregated and consolidated. Processing of incoming data is simplified, since newly formed session records are processed against consolidated data to add or update data structure entries without the need to store or further process the raw data packets or session records that have been previously aggregated and consolidated, reducing storage and computing needs. The amount of data stored and processed is further minimalized by flushing of the data structures at regular intervals.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to aggregate subscriber-perspective data from live data packets intercepted from network traffic, the method comprising:
   intercepting, from one or more intercept devices network coupled to one or more subscriber end devices, live packets of network traffic exchanged with a plurality of subscriber end devices wherein each subscriber end device being an end device correlated with a subscriber or a user;
   inspecting live packets of network traffic exchanged with a plurality of subscriber end devices by the one or more intercept devices, the packet inspection being performed in each of the one or more intercept devices at a location of interception of the live packets;
   determining if any portion of the intercepted live packets requires decryption;
   aggregating selected content data from the intercepted live packets and aggregating user plane data of respective different subscriber end devices and storing in a user plane data structure, at the point of interception, results of aggregating the user plane data of the respective different subscriber end devices;
   selecting, at the location, content data of the inspected packets that correspond to packets exchanged with a selected subscriber end device of the plurality of subscriber end devices;
   storing in a user plane data structure, at the point of interception, results of aggregating the user plane data;
   outputting, from each intercept device, results of the Aggregation in reconciliation with Deep Packet Inspection and the Processing and the Record Generation for the received live packets; and
   subsequent to selecting the content data, the method further comprises:
   identifying, at the location, a set of packets of the inspected packets included in respective sessions of a plurality of sessions, each session including packets included in a conversation conducted between the selected subscriber end device and a subsequent subscriber end device;
   generating, at the location, for each respective session, a session record including a summarization of contents included in the identified set of packets;
   wherein aggregating, at the interception location, the content data selected includes aggregating and consolidating session records that correspond to the respective sessions into consolidated data for the plurality of sessions; and
   the method further comprises providing selected data from the consolidated data at the location to a subscriber data analysis system at a further location remote from the location without the need to transmit raw data packets or session records.

2. The computer-implemented method of claim 1, further comprising intercepting the live data packets, wherein the interception of the live packets at the location of interception is the first interception of the live packets by any device.

3. The computer-implemented method of claim 2, further comprising:
   identifying, at the location, a set of packets of the inspected packets included in respective sessions, each session including packets included in a conversation conducted between the selected subscriber end device and a second subscriber end device; and
   generating, at the location, for each respective session, a session record including a summarization of contents included in the identified set of packets,
   wherein aggregating the content data selected includes aggregating session records that correspond to the respective sessions.

4. The computer-implemented method of claim 3, further comprising:
   repeatedly selecting the content data, aggregating the content data, and outputting the results of the aggregation for different selected subscriber end devices as live packets are inspected;
   discovering, at the location, from the session records that were aggregated for the different selected subscriber end devices, identifying information that identifies the different selected subscriber end devices and one or more network nodes exchanging network traffic with the different selected subscriber end devices; and
   storing in an identity discovery data structure, at the location, a single instance per identifying information discovered for the different selected subscriber end devices and the one or more network nodes.

5. The computer-implemented method of claim 4, wherein data associated with each single instance of the identifying information is updated using the results of the aggregating.

6. The computer-implemented method of claim 3, further comprising:
    receiving a request for detailed results associated with an individual session of the selected subscriber end device; aggregating metrics for the individual session of the respective sessions based on the request; and
    storing in response to the request, in an extended data structure, results of aggregating the metrics for the individual session.

7. The computer-implemented method of claim 4, wherein the aggregating further includes aggregating control plane data of the respective different subscriber end devices, the method further comprising storing in a control plane data structure, at the point, results of aggregating the control plane data of the respective different subscriber end devices.

8. The computer-implemented method of claim 7, wherein the control plane data structure includes a plurality of entries, each entry corresponding to an identified subscriber end device of the different subscriber end devices as identified by its identifying information.

9. The computer-implemented method of claim 8, wherein the respective entries of the control plane data structure further identify an application used by the subscriber end device identified for that entry and control plane metrics associated with the subscriber end device's usage of the identified application.

10. The computer-implemented method of claim 4, wherein the aggregating further includes aggregating voice and media transmission data of the respective different subscriber end devices, the method further comprising storing in a voice and media transmission data structure, at the point, results of aggregating the voice and media transmission data of the at least one respective different subscriber end devices.

11. The computer-implemented method of claim 10, wherein the voice and media transmission data structure includes a plurality of entries, each entry corresponding to an identified subscriber end device of the different subscriber end devices as identified by its identifying information.

12. The computer-implemented method of claim 11, wherein the respective entries of the voice and media transmission data structure further identify an application used by the subscriber end device identified for that entry and voice and media transmission metrics associated with the subscriber end device's usage of the identified application.

13. The computer-implemented method of claim 1, further comprising:
    storing results of the aggregating for each time interval of a series of periodic time intervals; and
    purging the stored results of the aggregating at the completion of each of the periodic time intervals.

14. The computer-implemented method of claim 1, wherein the user plane data structure includes a plurality of entries, each entry corresponding to an identified subscriber end device of the different subscriber end devices as identified by its identifying information.

15. The computer-implemented method of claim 14, wherein the respective entries of the user plane data structure further identify an application used by the subscriber end device identified for that entry and user plane metrics associated with the subscriber end device's usage of the identified application.

* * * * *